May 19, 1964  R. J. ZECH  3,133,431
TELESCOPING UNIVERSAL JOINT
Filed March 6, 1961
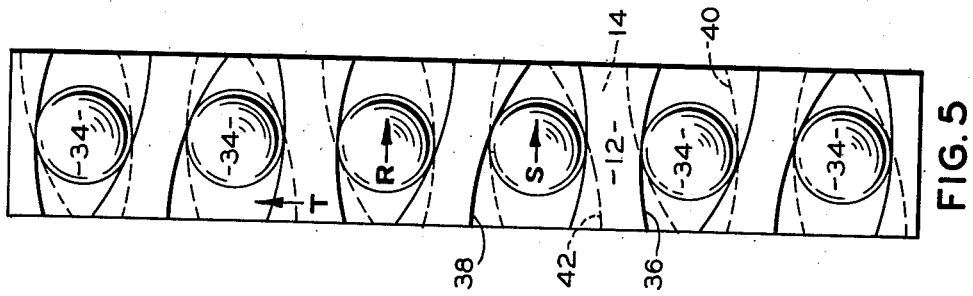
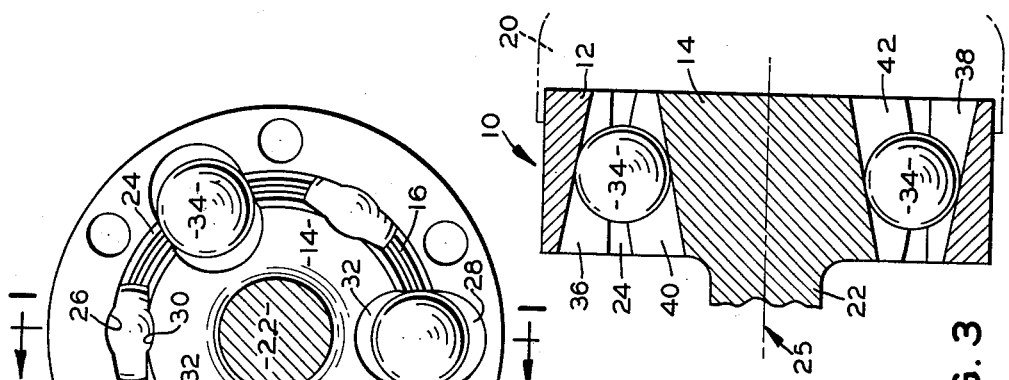
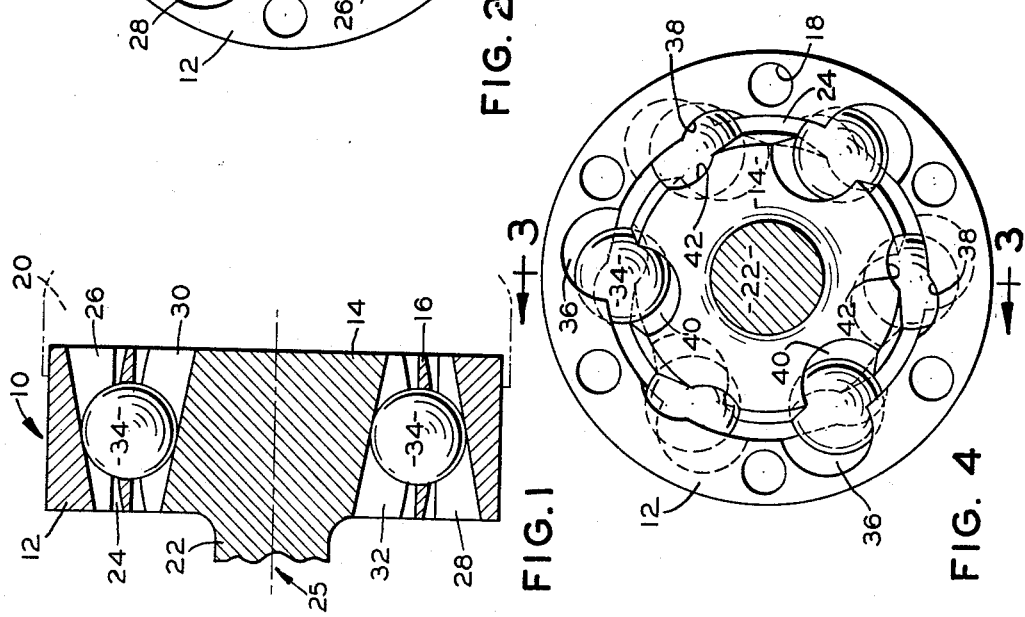

United States Patent Office 3,133,431
Patented May 19, 1964

3,133,431
TELESCOPING UNIVERSAL JOINT
Roman J. Zech, Detroit, Mich., assignor to Dana Corporation, Toledo, Ohio, a corporation of Virginia
Filed Mar. 6, 1961, Ser. No. 93,381
8 Claims. (Cl. 64—21)

This invention relates to universal joints in general and more specifically to constant velocity universal joints of the ball type wherein the torque transferring members are movable relative to one another in an axial direction.

It is a recognized fact that cross pin type universal joints, which were originated early in the art, when operating at an angle will distort the steady uniform rotation of the driving shaft to an irregular jerky rotary motion of the driven shaft. This distortion is not due to mechanical imperfection but, as is well known, is due to the faulty mechanical principle of this type of joint.

The greater angles of operation and speeds of rotation of present day joint applications have resulted in increased demands for workable and inexpensive constant velocity joints to overcome this irregular transfer of rotation. Constant velocity universal joints in themselves are old in the art and were primarily evolved to overcome the deficiences in the performance of the cross pin type joint. It is well known to those skilled in the art that in order to provide a transfer of rotation at a constant velocity between members disposed at an angle to one another it is sufficient to provide an intermediate revoluble member between the driving and driven members bisecting the angle between the axes of these members. In the ball type constant velocity universal joint, the driver balls serve as the intermediate member.

The present invention is directed to an improvement in ball type constant velocity universal joints. When the angle between the axes of the driving and driven members changes, resulting in axial displacement, or when the driving means and driven means vary in their relative axial displacement for other reasons, the coupling therebetween must have provisions therein to accommodate this variable length. In prior art couplings this variation is usually accommodated in a slip arrangement separate from the universal joint, such as the well known splined stub shaft and a sleeve yoke assembly, which yoke and shaft are movable relative to each other. However, this assembly by its very nature has a high degree of friction which resists such variation under a torque load. Another disadvantage is the plurality of parts involved since the slip joint and the universal joint are two separate structures.

Recent developments in constant velocity universal joint art have provided for accommodating the coupling's variation in length within the universal joint itself. In these joints the outer and inner races are arranged and constructed so that the inner and outer races are axially movable relative to each other. However, in these devices a complex problem arises, which problem pertains to the method of positioning the drive balls in a plane which bisects the angles between the axes of the members so as to serve as the intermediate revoluble member. Recent developments have provided means for positioning the balls in the bisecting plane; however, these means are highly complex and involve a multitude of parts and complicated operative structure.

It is therefore an object of this invention to provide a constant velocity universal joint which in itself will accommodate both the relative angular and axial displacement between the driving and driven means.

A further object of this invention is to provide such a constant velocity universal joint with simple drive ball positioning means requiring a minimum of parts.

Yet another object of this invention is to provide a constant velocity universal joint of the drive ball type wherein the relationship of cooperating drive ball grooves determine the bisecting plane.

It is a still further object of this invention to provide such a universal joint which is simple to construct, easy to assemble, yet inexpensive and durable.

Other and further objects of this invention will become apparent from the following detailed description when taken in conjunction with the accompanying drawings in which:

FIG. 1 is a sectional view of a universal joint made in accordance with this invention taken along the line 1—1 of FIG. 2;

FIG. 2 is an end elevational view, partly in section, of the universal joint shown in FIG. 1 with portions of the cage omitted to show the drive balls in full for added clarity;

FIG. 3 is a longitudinal view partially in section of another embodiment of this invention taken along the line 3—3 of FIG. 4;

FIG. 4 is an end elevational view partially in section of the universal joint shown in FIG. 3; and FIG. 5 is a diagrammatic view in the nature of a development of the universal joint shown in FIGS. 3 and 4.

In one preferred embodiment of this invention, the universal joint is composed of an outer member in the form of a race or housing having a central opening therein, which opening receives the inner member or race. The inner and outer members are constructed whereby they may move angularly and axially relative to each other without interference. Each member is provided with axially straight ball receiving grooves. Alternate grooves in the outer member are inclined toward a common point on the axis of the member while the remaining grooves in the member are inclined oppositely to the first grooves and at the same angle. Alternate grooves on the inner member are inclined toward a common point on the axis of the member while the remaining grooves in the member are inclined oppositely but at the same angle. The inner and outer members are assembled so that the mating grooves converge towards one end of the members and diverge toward the other end, that is, the mating grooves are inclined oppositely. Interposed in driving relation between the inner and outer members and contained within the drive ball grooves are a plurality of drive balls to transfer torque between the members. Embracing the drive balls and maintaining them within a single plane is a ball cage, which cage while being positioned between the members is free from positioning engagement therewith. It is apparent that since half the cooperating drive ball grooves converge in one direction and the other half of the drive ball grooves converge in the opposite direction, with reference to the axes of the inner and outer members, half of the drive balls will be urged axially in one direction and the other half of the drive balls will be urged axially in the opposite direction. However, since the balls are maintained in the embracing ball cage they are held within a single plane and can not move axially relative to each other. The action of the drive ball grooves upon the drive balls themselves determines the bisecting plane and positions the balls therein in a well known manner. Since the inner and outer races are arranged so that they can move axially and angularly without interference, the assembled joint with the cage interposed between the members can accommodate relative axial movement between the inner and outer members in response to external forces acting thereon.

Referring now to the drawings and more particularly to FIGS. 1 and 2 the universal joint generally indicated at 10 comprises an outer annular member 12, an inner member 14, and an intermediate cage member 16. The outer member 12 is formed with axially extending openings 18 through which bolts may be passed to fasten the member 12 to a member 20; the member 20 being either the driven or driving member of a coupling joined by the universal joint of this invention. The inner member 14 is preferably formed as an integral, enlarged portion of driving or driven shaft 22; however, these may be separate parts and joined together in any well known manner.

The outer member 12 is provided with a substantially cylindrical axially extending opening 24, which receives the inner member 14. The inner member 14 and outer member 12 are constructed so that relative axial and angular movement therebetween takes place with no interference.

The outer member or race 12 has a first and a second plurality of substantially axially straight, alternate grooves 26 and 28 provided therein, the adjacent grooves of which are oppositely inclined at the same angle relative to the longitudinal axis of the member 10. More specifically, as shown in FIG. 1, the grooves 26 are inclined radially inwardly toward the left with respect to the longitudinal axis 25 of the outer member 12 while the grooves 28 are inclined radially inwardly towards the right with respect to the longitudinal axis 25 of the outer member 12.

The inner member 14 also has a first and a second plurality of substantially axially straight, alternate grooves 30 and 32 provided therein, the adjacent grooves of which are oppositely inclined at the same angle relative to the longitudinal axis of the member 14. More specifically as shown in FIG. 1 the grooves 30 are inclined radially inwardly toward the right with respect to the axis 25 of the inner member 14 while the grooves 32 incline radially inwardly toward the left with respect to the axis 25 of the inner member 14. The outer and inner members 12 and 14 are assembled so that the grooves 26 and 30 and the grooves 28 and 32 are juxtaposed in mating cooperating relationship. More specifically, as shown in FIG. 1 the grooves 26 and 30 are juxtaposed and the grooves 28 and 32 are juxtaposed and positioned so that these grooves are inclined oppositely. As is evident from FIGS. 1 and 2, alternate grooves converge toward the same end of the joint while adjacent grooves converge toward the opposite end of the joint 10.

Interposed in driving relationship between the outer and inner members 12 and 14 and positioned within each pair of cooperating grooves 26—30, 28—32, is a drive ball 34 for transmitting torque therebetween. As is apparent from FIG. 1, the drive balls in the cooperating grooves 26 and 30, upon the transfer of torque between the inner and outer members or when the members are disposed at an angle relative to each other, are urged axially to the right; conversely under the same operative conditions the drive balls 34 positioned in the cooperating grooves 28 and 32 are urged axially to the left. However, the drive balls 34 are embraced by the intermediate cage member 16, which member positions the drive balls in uniplanar relationship, that is within a single movable plane, thereby restraining the balls from moving in response to the axial urging by balancing the axial forces.

The intermediate cage member 16 while positioning the balls 34 within a single plane in no way determines the location of this plane. The position of this plane, which for true constant velocity transfer of rotative movement between the inner and outer member must bisect the angle defined by the intersection of the axes of these members, is determined by the engagement of the balls with the cooperating grooves which pilot the balls to the half angle in a well known manner. It is evident that when operating at certain angles some of the cooperating grooves will become parallel and aligned and no longer position the ball contained therein; however, the balance of the grooves which are still oppositely inclined with respect to one another and whose axes' planes intersect because of the angular displacement will position the ball contained therein and thereby, through the action of the embracing cage, position the balls in the aligned grooves within the single bisecting plane.

As is apparent from FIGS. 1 and 2 the outer and inner members 12 and 14 do not engage each other in any manner. It is also apparent that the intermediate cage member 16 is proportioned so that it also does not engage either the inner or outer members 14 and 12. For this reason the inner and outer members are free to move both angularly and axially relative to each other in response to external forces. Since the ball cage merely positions the balls in a single plane and does not determine the bisecting plane there is no necessity for the cage to positionably contact either the inner or outer member. In addition, since the axial forces upon the balls 34 are equal and opposite, and the balls are all positioned within the embracing cage 16, the axial forces upon the cage 16 are balanced, and therefore for this reason also the cage member 16 need not positionably engage the inner member 14 or outer member 12.

Referring now to the second embodiment of this invention as shown in FIGS. 3 and 4, wherein similar parts are designated by the same numerals used in the previous embodiment, the outer member 12 of the universal joint shown generally at 10 has a substantially cylindrical axial opening 24 provided therein. Received within this axial opening is the inner member 14. As evident from FIGS. 3 and 4 the inner and outer members 14 and 12 are constructed so that they in no way engage one another and therefore are free to move both axially and angularly relative to one another. The outer member 12 has a first and a second plurality of grooves 36 and 38 provided therein. Each of the first plurality of grooves 36 has an axis with both axial and transverse components and is inclined toward the longitudinal axis of the outer member 12. Each of the second plurality of groove means 38 in said outer member has an axis with both axial and transverse components and is inclined toward the longitudinal axis of the outer member oppositely with respect to said first plurality of groove means in said outer member. More specifically, the grooves 36 and 38 may be either spiral or skewed with respect to the axis of the member 12; however, all the grooves either spiral right hand or left hand or are skewed right hand or left hand; the grooves 36 spiraling toward one side of the joint and the grooves 38 spiraling toward the other side of the joint. Likewise if they are skewed, the skewed grooves 36 are inclined radially inwardly toward one side of the joint while the grooves 38 are inclined radially inwardly toward the opposite side of the joint. Yet another manner of describing the positioning of the grooves is to envision a cone on either side of the outer member with the base of the cone defined by the outer member and the apex of each cone lying on opposite sides of the axis of the outer member 12. The axes of the spiral grooves 36 would lie on the surface of one of the cones while the axes of the spiral grooves 38 would lie on the cone extending in the opposite direction; however, both the grooves 36 and 38 would either spiral right hand or left hand. In the case of skewed grooves, the grooves 36 would lie tangent to one of the cones while the skewed grooves 38 would lie tangent to the opposite cone; however, the skewed grooves 36 and 38 would each be skewed in the same direction, either right hand or left hand.

The inner member 14 is provided with a first and second plurality of grooves 40 and 42; the members 14 and 12 being so positioned that the grooves 40 are in juxtaposed, mating, cooperating relationship with grooves 36 and the grooves 42 are in juxtaposed, mating, cooperating relationship with the grooves 38. The grooves 40 are so positioned and arranged that they are mirror images of the grooves 36 and the grooves 42 are so positioned and arranged that they are mirror images of the grooves 38. More specifically, each of the grooves 40 has an axis with both axial and transverse components and is inclined toward the longitudinal axis of the inner member 14 in a direction opposite to the inclination of the juxtaposed groove 36, while each of the grooves 42 has an axis with both axial and transverse components and is inclined toward the longitudinal axis of member 14 oppositely with respect to the inclination of the juxtaposed groove 38. It is therefore apparent from FIG. 3 that the grooves 36 and 40 converge toward the right side of the joint 10 while the grooves 38 and 42 converge toward the left of the joint 10, and as is apparent from FIG. 4 the axes of the grooves 36 and 40 are in intersecting relationship while the axes of the grooves 38 and 42 are also in intersecting relationship.

A drive ball 34 is positioned in each pair of juxtaposed grooves 36—40 and 38—42, and since these grooves are in intersecting relationship the balls 34 can occupy only one position, that being at the intersection of the grooves. Referring now to FIG. 5, wherein the universal joint of FIGS. 3 and 4 is represented diagrammatically in the nature of a development, the cooperating grooves 36 and 40 and 38 and 42 are shown with the drive balls 34 positioned therein. It is apparent that, if torque is transferred from the outer member 12 to the inner member 14 in the direction of the arrow T, the drive balls 34 contained in the grooves 38—42 will be urged axially in the direction of the arrow S. Since the grooves 38 and 42 converge in that direction, the ball 34 will be wedged within the converging grooves and limited from its axial movement. Likewise, with respect to the grooves 36 and 40, when torque is transferred in direction of the arrow T the ball 34 will be urged in the direction of arrow R toward the diverging ends of the grooves 36 and 42; however, it will be restrained from moving axially because it can only occupy the position defined by the intersection of the grooves. Since the ball 34 has become wedged in the grooves 38 and 42, the inner and outer members 14 and 12 cannot rotate relative to each other. Therefore, the grooves 36 and 40 are restrained from becoming aligned by the relative rotative movement of the parts 12 and 14 and therefore will continue to be in an intersecting relationship. As long as they are in an intersecting relationship the ball 34 will be maintained threein. However, since the ball 34 has been urged toward the diverging portion of the grooves 36—40 in the direction of the arrow R, it is not capable of transferring torque between the two members and is in a "loose" position and all torque is transferred between the members 12 and 14 by the balls 34 wedged within the grooves 38 and 42. Therefore, it is apparent that when the outer and inner members 12 and 14 are transferring torque therebetween only half of the drive balls are available to transfer this torque; the other half of the drive balls being in an inoperative position.

Since upon axial urging of the drive balls 34 they are restrained from moving axially out of the joint by (1) some of the balls 34 being wedged within the converging grooves, and (2) the balance of the balls 34 being held by the intersection of the diverging grooves, there is no need for a ball cage to position the driver balls in a single plane or to prevent them from moving axially. The drive balls are positioned within a bisecting plane by the action of the cooperating grooves in a well known manner.

It is apparent that at certain angles of operation of this joint some of the intersecting grooves will become aligned and not control the ball that is contained therein. Therefore, for any particular joint there is a maximum operating angle; however, relatively large operational angles may be accommodated by making the angular skew or spiral displacement or inclination of the grooves sufficiently large so that the grooves will not become aligned within the limits of the joint operation.

The outer member 12 of the joint 10 as shown in FIG. 4 is also provided with a plurality of axial holes 18 whereby the outer member 12 may be fixedly connected to a member 20, which member 20 may either be the driving or driven member of the coupling to be joined. The inner member 14 is preferably an integral enlarged portion of the driving or driven shaft 22; however, these parts may be made separately and fixedly interconnected in any suitable manner.

It is also apparent from the description and drawings of these two embodiments that assembling these joints is extremely simple, and, inasmuch as there is clearance between the inner and outer members, provisions need not be made for turning the inner member 90° on its axis in order to insert it into the outer member and therefore the inner member 14 may be an integral portion of the shaft 22, for easy and inexpensive manufacture.

It should be noted that the embodiment of this universal joint as shown in FIGS. 1 and 2 can be made to give an anti-squat effect, that is, the transfer of torque between the inner and outer members 14 and 12 results in an axial urging of the inner and outer member relative to each other. This can be accomplished by making half of the grooves of the outer and inner members 12 and 14 with a different inclination than the other half, or by introducing unequal spiral or skew angles to some or all of the grooves while retaining the ball cage.

It is now apparent from the foregoing that constant velocity universal joints have been described that will in themselves accommodate relative angular and axial displacement between a driving and driven means at a very low degree of friction and with the balance of axial forces therein; that a minimum number of means to position the bisecting planes and the driving balls is required; that is integrally constructed, easy to assemble and yet inexpensive and durable.

The preferred embodiments of this invention have been shown and described, but changes and modifications can be made and it is understood that this description is illustrative only and not for the purpose of rendering this invention limited to the details illustrated or described except insofar as they have been limited by the terms of the following claims.

What is claimed is:

1. A constant velocity universal joint having intermediate revoluble means which bisects the angle defined by the intersection of the axes of the drive and driven members comprising in combination, an outer member having an axial opening therein, an inner member disposed within the axial opening, torque transferring means disposed between said inner and outer members for transmitting torque therebetween, means maintaining said torque transferring means in uniplanar relationship, and groove means disposed in said inner and outer members and receiving said torque transferring means, said groove means each having an axis with a component inclined toward the axis of the member in which it is disposed, said outer and inner members being both axially and angularly movable relative to each other and to said maintaining means to permit axial displacement of the drive and driven members while transferring torque at a constant velocity.

2. A constant velocity universal joint having intermediate revoluble means which bisects the angle defined by the intersection of the axes of the drive and driven members comprising in combination, an outer member having an axial opening therein, an inner member disposed within the axial opening, torque transferring means disposed between said inner and outer members for transmitting torque therebetween, means maintaining said torque transferring means in uniplanar relationship, and substantially axial groove means disposed in said inner and outer members and receiving said torque transferring means, each of said groove means having an axis with a component inclined toward the axis of the member in which it is disposed, said outer and inner members being both axially and angularly movable relative to each other and to said maintaining means to permit axial displacement of the drive and driven members while transferring torque at a constant velocity.

3. A constant velocity universal joint having intermediate revoluble means which bisects the angle defined by the intersection of the axes of the drive and driven members comprising in combination, an outer member having an axial opening therein, an inner member disposed within the axial opening, torque transferring means disposed between said inner and outer members for transmitting torque therebetween, means maintaining said torque transferring means in uniplanar relationship, and a first and a second like plurality of substantially axial groove means disposed in said inner and outer members and receiving said torque transferring means, each of said first plurality of groove means having an axis with a component inclined toward the axis of the member in which it is disposed, each of said second plurality of groove means being inclined oppositely with respect to said first plurality of groove means, said outer and inner members being both axially and angularly movable relative to each other and to said maintaining means to permit axial displacement of the drive and driven members while transferring torque at a constant velocity.

4. A constant velocity universal joint for drivingly connecting drive and driven members and having intermediate revoluble means which bisects the angle defined by the intersection of the drive and driven members comprising in combination, an outer member having an axial opening therein, an inner member disposed within the axial opening, torque transferring means disposed between said inner and outer members for transmitting torque therebetween, means maintaining said torque transferring means in uniplanar relationship, a plurality of groove means disposed in said inner and outer members and receiving said torque transferring means, alternate grooves in said outer member being inclined toward a common point on the axis of said outer member, the other grooves in said outer member being oppositely inclined with respect to said alternate grooves, alternate grooves in said inner member being inclined toward a common point on the axis of said inner member, the other grooves in said inner member being oppositely inclined with respect to said alternate grooves in said inner member, said outer and inner members being positioned with the grooves in the said members in converging relationship, said outer and inner members being both axially and angularly movable relative to each other and to said maintaining means to permit axial displacement of the drive and driven members while transferring torque at a constant velocity.

5. A constant velocity universal joint for drivingly connecting drive and driven members and having intermediate revoluble means which bisects the angle defined by the intersection of the drive and driven members comprising in combination, an outer member having an axial opening therein, an inner member disposed within the axial opening, a plurality of drive balls disposed between said inner and outer members for transferring torque therebetween, a ball cage embracing and maintaining said drive balls in uniplanar relationship, a plurality of groove means disposed in said inner and outer members, alternate groove in said outer member being inclined toward a common point on the axis of said outer member, the other grooves in said outer member being oppositely inclined with respect to said alternate grooves, alternate grooves in said inner member being inclined toward a common point on the axis of said inner member, the other grooves in said inner member being oppositely inclined with respect to said alternate grooves in said inner member, said outer and inner members being positioned with the grooves in the said members in paired converging relationship, one of said plurality of drive balls being positioned in each pair of converging grooves, said outer and inner members being both axially and angularly movable relative to each other and to said ball cage to permit axial displacement of the drive and driven members while transferring torque at a constant velocity.

6. A constant velocity universal joint of the type wherein a pair of rotary members provided with grooves having axes with at least an axial component are coupled for rotation by a plurality of torque transferring means received in the grooves and axially movable relative thereto while having means including at least maintaining means positioning the torque transferring means in a single plane bisecting the angle defined by the rotary members, comprising in combination, a first member, a second member operatively associated with said first member, said members having a longitudinal axis and being provided with an equal and even plurality of grooves with each groove in said first member being disposed in co-operating relationship with a groove in said second member, a first half of said plurality of grooves in said first member having an axis with a component radially approaching the longitudinal axis of said first member toward one longitudinal side of said first member and the second half of said plurality of grooves in said first member having an axis with a component radially approaching the longitudinal axis of said first member toward the opposite longitudinal side of said first member with respect to the first half of said plurality of grooves, the grooves in said second member radially approaching the longitudinal axis of said second member on the opposite longitudinal side of said second member with respect to the groove of said first member in co-operation therewith, said grooves in each of said members extending axially in the same manner with respect to the other grooves in said member, and said first and second members being both angularly and axially movable relative to each other and to said torque transferring means and maintaining means to permit axial displacement of said members while transferring torque at a constant velocity.

7. A constant velocity universal joint of the type wherein a first and a second rotary member provided with mating grooves each having at least an axial component are coupled for rotation by means of a plurality of torque transferring means engaging the grooves and having means including at least a cage means for positioning the torque transferring means in a single plane bisecting the angle defined by the rotary members, characterized in that said first and second members each contain a plurality of grooves, a first group of the plurality of grooves in each member being inclined toward the longitudinal axis of said member containing the same and the remainder of the plurality of grooves in each member being inclined toward said longitudinal axis oppositely with respect to said first group of grooves, said members being assembled so that the axes of mating grooves are inclined oppositely when the axes of the members coincide, and said members being both axially and angularly movable relative to each other and to said torque transferring means and cage means to permit axial displacement of said members while transferring torque at a constant velocity.

8. A constant velocity universal joint of the type wherein first and second rotary members provided with grooves having at least an axial component are coupled for rotation by means of a plurality of torque transferring means engaging the grooves characterized in that said first and second members are provided with grooves disposed in paired co-operating relationship, some of said grooves in each member being inclined toward the longitudinal axis of said member containing the same and the balance of the grooves in each member being inclined toward said longitudinal axis oppositely with respect to the other grooves in said member, said members being assembled so that the axes of mating grooves are inclined oppositely when the axes of the members coincide, torque transmitting means disposed in said mating grooves, and means including maintaining means and at least said grooves for maintaining said torque transmitting means in a single plane bisecting the angle defined by said rotary members, said members being both axially and angularly movable relative to each other and to said torque transferring means and maintaining means to permit axial displacement of said members while transferring torque at a constant velocity.

References Cited in the file of this patent

UNITED STATES PATENTS

| | | |
|---|---|---|
| 2,309,939 | Dodge | Feb. 2, 1943 |
| 2,321,448 | Anderson | June 8, 1943 |
| 2,949,022 | Leon | Aug. 16, 1960 |

FOREIGN PATENTS 1,177,760 France _____ Apr. 29, 1959
(U.S. corresponding Patent 3,022,364, Oct. 3, 1961)